United States Patent
Barger et al.

(10) Patent No.: US 11,090,593 B2
(45) Date of Patent: Aug. 17, 2021

(54) COMPRESSED AIR FLUID SEPARATOR WITH VORTEX BAFFLE

(71) Applicant: Suburban Manufacturing, Inc., Monticello, MN (US)

(72) Inventors: Rick Barger, Monticello, MN (US); Jason Meyer, St. Cloud, MN (US)

(73) Assignee: Suburban Manufacturing, Inc., Monticello, MN (US)

( * ) Notice: Subject to any disclaimer, the term of this patent is extended or adjusted under 35 U.S.C. 154(b) by 364 days.

(21) Appl. No.: 16/211,873

(22) Filed: Dec. 6, 2018

(65) Prior Publication Data
US 2020/0179850 A1    Jun. 11, 2020

(51) Int. Cl.
| | | |
|---|---|---|
| *B01D 45/16* | (2006.01) | |
| *B01D 45/08* | (2006.01) | |
| *B01D 50/00* | (2006.01) | |
| *B01D 46/10* | (2006.01) | |

(52) U.S. Cl.
CPC .......... *B01D 45/16* (2013.01); *B01D 45/08* (2013.01); *B01D 50/002* (2013.01)

(58) Field of Classification Search
CPC ........ B01D 45/08; B01D 45/06; B01D 45/16; B01D 50/002; B01D 46/106; A47L 9/1683
See application file for complete search history.

(56) References Cited

U.S. PATENT DOCUMENTS

| | | | |
|---|---|---|---|
| 2,290,323 A | | 7/1942 | Graham |
| 3,902,876 A | | 9/1975 | Moen et al. |
| 4,382,804 A | * | 5/1983 | Mellor ................. A47L 9/102 95/270 |
| 4,420,314 A | * | 12/1983 | Barron, Jr. ............. B04C 5/06 55/436 |
| 4,668,256 A | * | 5/1987 | Billiet ................. B01D 45/08 55/337 |
| 5,622,545 A | | 4/1997 | Mazzei et al. |
| 7,811,344 B1 | | 10/2010 | Duke et al. |
| 9,084,946 B2 | | 7/2015 | Stapleton |
| 2004/0144256 A1 | | 7/2004 | Mazzei |
| 2010/0186355 A1 | * | 7/2010 | Fujiyama ............. B04C 5/06 55/440 |

\* cited by examiner

*Primary Examiner* — Lucas A Stelling
*Assistant Examiner* — Hafiz Muhammad Aamir
(74) *Attorney, Agent, or Firm* — Dicke, Billig & Czaja, PLLC

(57) ABSTRACT

A fluid separator for a compressed air system including a head cap defining an inlet port and an outlet port, a first body defining an inner air shaft extending from an upper end to an opposing lower end, the upper end in fluid communication with the inlet port, and a vortex baffle disposed about the lower end of the inner air shaft. A second body forms an outer air shaft about the inner air shaft and vortex baffle, the outer air shaft extending from a lower end proximate to the vortex baffle to an upper end in fluid communication with the outlet port.

17 Claims, 4 Drawing Sheets

COMPRESSED AIR FLUID SEPARATOR WITH VORTEX BAFFLE

BACKGROUND

Compressed air systems are used in a wide variety of applications, including to power air-driven devices, such as spray or paint guns in compressed air painting systems, for example. If not removed from a compressed air stream, contaminants such as water and oil, for example, may damage air-powered devices and adversely affect processes, such as by contaminating paint in spray painting processes, for instance.

SUMMARY OF THE INVENTION

One example provides a fluid separator for a compressed air system including a head cap defining an inlet port and an outlet port, a first body defining an inner air shaft extending from an upper end to an opposing lower end, the upper end in fluid communication with the inlet port, and a vortex baffle disposed about the lower end of the inner air shaft. A second body forms an outer air shaft about the inner air shaft and vortex baffle, the outer air shaft extending from a lower end proximate to the vortex baffle to an upper end in fluid communication with the outlet port.

One example provides a method of separating fluid from a compressed air flow. The method includes directing an incoming compressed air flow downwardly through a first air shaft from an upper end to a lower end to form a downwardly flowing linear air flow, and transforming the downwardly flowing linear air flow exiting the lower end of the first air shaft into an upwardly flowing vortical air flow within a second air shaft from an lower end to an upper end.

DETAILED DESCRIPTION

In the following Detailed Description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
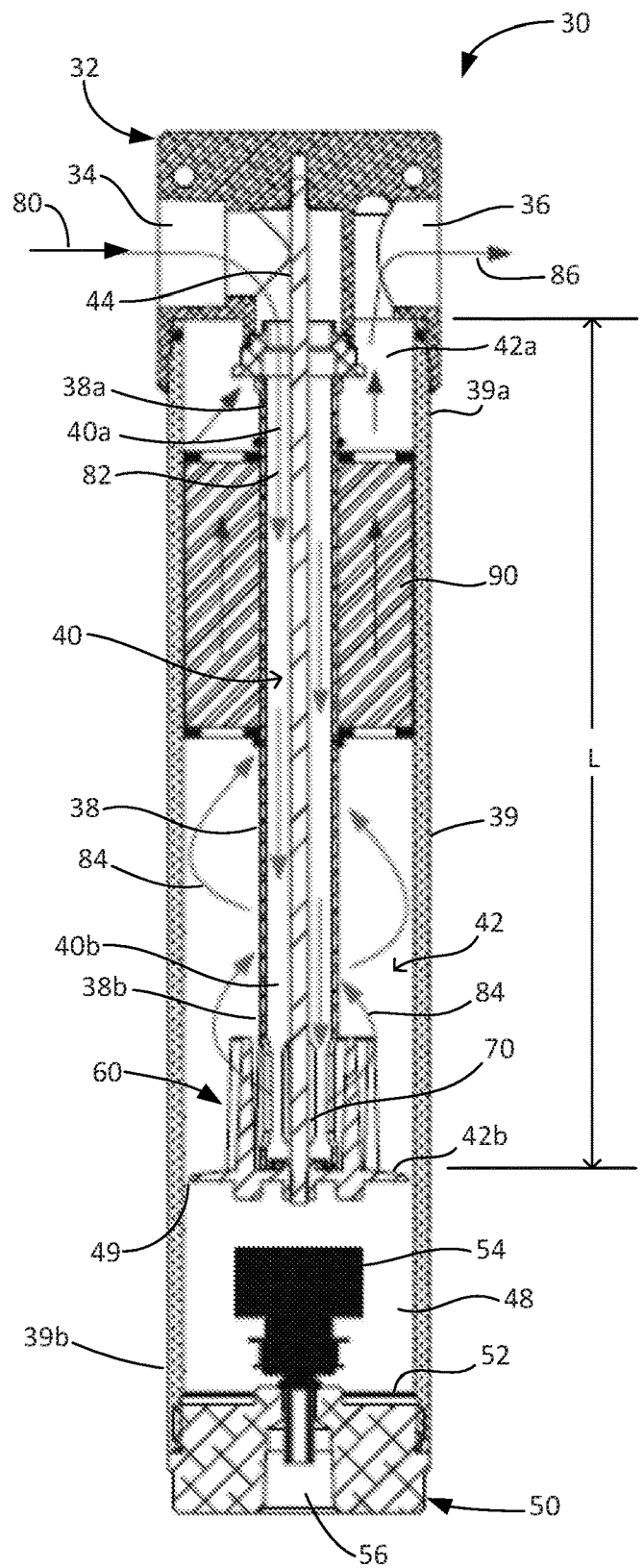
FIG. 1 is a cross-sectional view of a fluid separator including a vortex baffle, according to one example.

FIG. 1 is a cross-sectional view of a fluid separator 30, according to one example of the present disclosure, for separating water and other contaminants, such as oil, for example, from a flow of compressed air. Fluid separator 30 includes a head cap 32 defining an inlet port 34 and an outlet port 36. Head cap 32 is coupled to an upper end 38a of a first body 38 forming a first or inner air shaft 40, and is coupled to an upper end 39a of a second body 39 forming a second or outer air shaft 42, where first body 38 is disposed concentrically within second body 39, with an upper end 40a of inner air shaft 40 in fluid communication with inlet port 34, and an upper end 42a of outer air shaft 42 in fluid communication with outlet port 36 In one example, as illustrated, first body 38 and second body 39 are tubular in shape, with first body 38 being disposed concentrically within second body 39. In one example, first body 39 is coupled to head cap 32 via a threaded rod 44, and second body 39 is coupled to head cap 32 via a threaded connection as indicated at 46. A bottom cap 50 is coupled to a lower end 39b of second body 39, with bottom cap 50 forming a bottom 52 of outer air shaft 42.

According to one example, a vortex baffle 60 is coupled to a lower end 38b of first body 38 and forms a bottom of inner air shaft 40. In one example, as illustrated, portions of vortex baffle 60 (including air foil fins 64, see below) are concentrically disposed about an outer surface of lower end 38b of first body 38. In one example, vortex baffle 60 is disposed about a plurality of exit air slots 70 disposed about a circumference of first body 38 at lower end 38b. In one example, a longitudinal dimension of exit air slots 72 extends vertically in the axial direction of first and second tubular bodies 38 and 39. In one example, first body 38 includes four exit air slots 70 which are evenly spaced at 90-degree intervals about the circumference of first body 38 at lower end 38b.

In one example, vortex baffle 60 is coupled to lower end 38b of first body 38 via threaded rod 44, where threaded rod 44 extends axially through inner air shaft 40 and makes a threaded connection with both head cap 32 and vortex baffle 60. In one example, vortex baffle 60 threads onto a lower end of threaded rod 44 and is tightened so as to compressively retain first body 38 between vortex baffle 60 and head cap 32.

Figure 2:
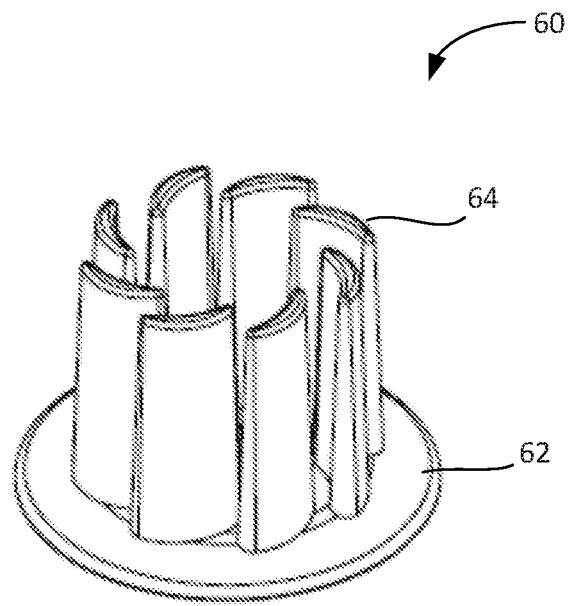
FIG. 2 is a top perspective view illustrating a vortex baffle, according to one example.
Figure 3:
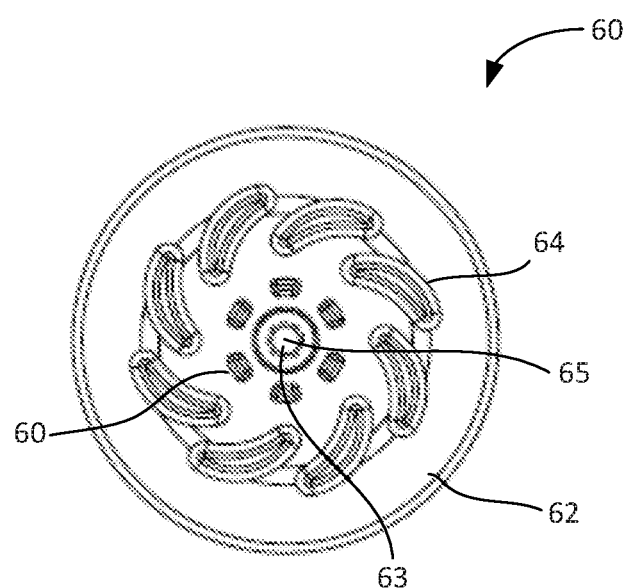
FIG. 3 is a top view illustrating a vortex baffle, according to one example.
Figure 4:
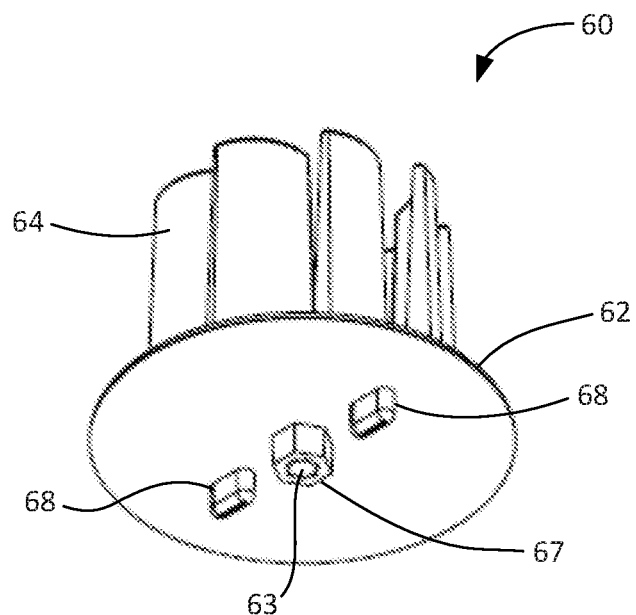
FIG. 4 is a bottom perspective view generally illustrating a vortex baffle, according to one example.
Figure 5:
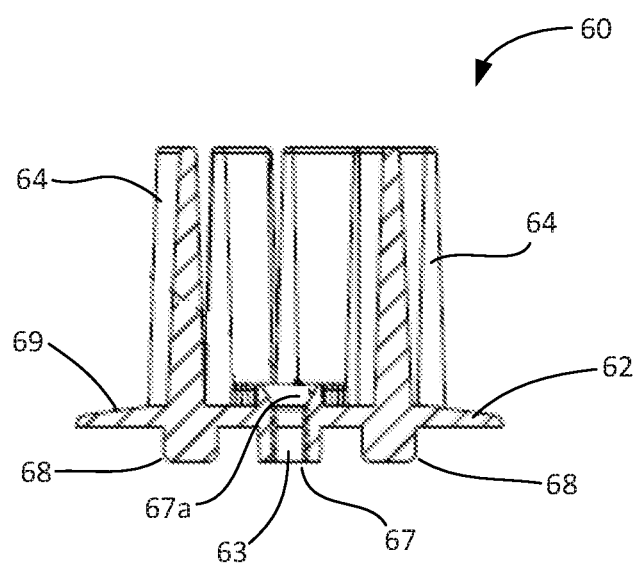
FIG. 5 is a cross-sectional view of a vortex baffle, according to one example.

FIGS. 2-4 respectively illustrate a top perspective view, a top view, a bottom perspective view, and a cross-sectional view of vortex baffle 60, according to one example of the present disclosure. According to one example, vortex baffle 60 includes a base flange 62 which defines a floor 42b of outer air shaft 42, with a sump region 48 being defined within outer air shaft 42 below vortex baffle 60, with a bottom 52 of sump region 48 formed by bottom cap 50 (see FIG. 1). In one example, a float drain 54 controls a release of accumulated fluids (e.g., water, oil) within sump region 48 via a drain opening 56 extending through bottom cap 50.

Returning to FIGS. 2-4, according to one example, vortex baffle 60 includes a plurality of curved airfoil fins 64 evenly spaced circumferentially about an axis 65 of vortex baffle 60 (which coincides with the axes of inner and outer air shafts 40 and 42 and threaded rod 44) and an opening 63 through which threaded rod 44 extends. In one example, a longitudinal dimension of airfoil fins 64 extends vertically in the axial direction of inner and outer air shafts 40 and 42. In one example, vortex baffle 60 includes eight airfoil fins 64 spaced at 45-degree intervals about the circumference. In one example, vortex baffle 60 includes a plurality of alignment tabs 66 disposed on base flange 62, where alignment tabs 66 engage with alignment elements along a bottom edge of inner air shaft 40 (not illustrated) to ensure that airfoil fins 62 align with exit air slots 70 so that air flow from exit air slots 70 is evenly distributed through airfoils fins 64. Although illustrated as employing eight airfoils fins 64, it is noted that different numbers of airfoil fins 64 may be employed.

In one example, vortex baffle 60 includes an integral nut 67 extending from a bottom surface of base flange 62 and having internal threading to receive and thread to threaded rod 44 via an opening 63. In one example, the bottom surface of base flange 62 further includes tabs 68 extending there from which enable tool-less assembly and disassembly of inner air shaft 40, vortex baffle 60, and threaded rod 44 with head cap 32. In one example, as illustrated at 69, the upper surface of base flange 62 forming the floor 42b of outer air shaft 42 (see FIG. 1) is downwardly tapered to promote drainage of separated fluids from vortex baffle 60 to sump region 48, where such fluids travel through the gap 49 between base flange 62 and second body 39 (see FIG. 1).

With reference to FIG. 1, in operation, fluid separator 30 receives an incoming compressed air flow 80 via inlet port 34, with incoming compressed air flow 80 being directed downward by inlet port 34 to form a downwardly flowing linear air flow 82 through within inner air shaft 40 from upper end 40a to lower end 40b. Upon reaching lower end 40b of inner air shaft 40, linear air flow 82 is prevented from flowing further downward by base flange 62 of vortex baffle 60 and is forced laterally out of inner air shaft 40 via exit air slots 70. As linear air flow 82 laterally exits inner air shaft 40 via exit air slots 70, linear air flow 82 is forced through airfoil fins 64, such that base flange 62 and airfoil fins 64 transform the downwardly flowing linear air flow 82 into a laminar vortical air flow 84 which flows upwardly through outer air shaft 42 from floor 42b toward outlet port 36.

As linear air flow 82 is transformed into vertical air flow 84, which flows upwardly within outer air shaft 42 in a vortex-like fashion (helically) about inner air shaft 40, centrifugal force generated by the vertical air flow 84 pushes fluids (and other contaminants), such as water or oil, for example, outwardly against toward second body 39. As a result, such contaminants collect on the inner surfaces of second body 39 and drain downwardly by gravity to sump region 48 via a gap 49 between vortex baffle 60 and second body 39. Additionally, due to a tapered shape 69 of base flange 62, contaminants, such as water or oil, for example, which may collect on surfaces of vortex baffle 60 also drain by gravity to sump region 48.

In one example, fluid separator 30 further includes a mesh filter 90 disposed about inner air shaft 40 within outer air shaft 42 and positioned between vortex baffle 60 and outlet port 36. Mesh filter 90 receives removes contaminants which may remain within vortical air flow 84 to provide outlet air flow 86, where removed contaminants drain by gravity to sump region 48 along the inner walls of outer body 39. In one example, mesh filter 90 comprises a stainless steel mesh.

Some known fluid separators utilize a downwardly flowing vortical air flow which is formed at a top of the fluid separator proximate to the intake port. As a result, fluids which have been separated by centrifugal forces from the compressed air flow often drip downwardly by the force of gravity from inner surfaces of the fluid separator, where at least a portion of the downwardly dripping fluids becoming re-entrained in the downwardly flowing vortical air flow and, thus, are not removed from the air flow. In some designs, the downwardly flowing vortical air flow is later transitioned to an upwardly flowing liner air flow to form an output air flow from an outlet port, where the output air flow undesirably includes the re-entrained fluids. In other designs, the vortical air flow is formed adjacent to both the inlet and outlet port such that separated fluid can be drawn into an output filter at the outlet port and carry over into the output air flow.

In contrast, as described above, according to present disclosure, vortex baffle 60 is disposed vertically below and spaced from outlet port 36 by at least a length, L, of inner air shaft 40. By disposing vortex baffle 60 vertically below outlet port 36 by at least the length of inner air shaft 40 and proximate to the bottom of both inner and outer air shafts 40 and 42 where downwardly flowing air flow 82 reverses into upwardly flowing vortcal air flow 84, the likelihood that fluids which have been removed from the compressed air flow by centrifugal force will be re-entrained in the upwardly flowing vortical air flow is greatly reduced, thereby providing an improved output air flow 86. By creating the vortical air-flow 84 at the floor 42b of outer air shaft 42 where the downwardly flowing linear air flow 82 is reversed to upwardly flowing vortical air flow 84, rather than becoming re-entrained in upwardly flowing vortical air flow 84, fluids that have been separated by centrifugal forces from the air flow drain by gravity directly to sump region 48 without having to pass through the air flow (i.e., separated fluids do not drip or fall by gravity through upwardly flowing vertical air flow 84). As such, the resulting output air flow 86 is free from such re-entrained fluids.

Additionally, by creating upwardly flowing vortical air flow 84 in outer air shaft 42, about inner air shaft 40, a vertical component of the velocity of vortical air flow 84 is reduced (as opposed to employing an upwardly flowing linear air flow in the absence of vortex baffle 60). By reducing the magnitude of the vertical component of the air velocity, the likelihood that fluids separated from vortical air flow 84 will remain separated therefrom is increased.

Also, by creating laminar vortical air flow 84 at the transition from downwardly flowing air to upwardly flowing air, vortex baffle 60 reduces a pressure drop within fluid separator 30 at such transition point (as compared to merely converting a downwardly flowing linear air flow into an upwardly flowing linearly air flow). Reducing pressure drops thereby advantageously increases an efficiency of fluid separator 30.

Figure 6:
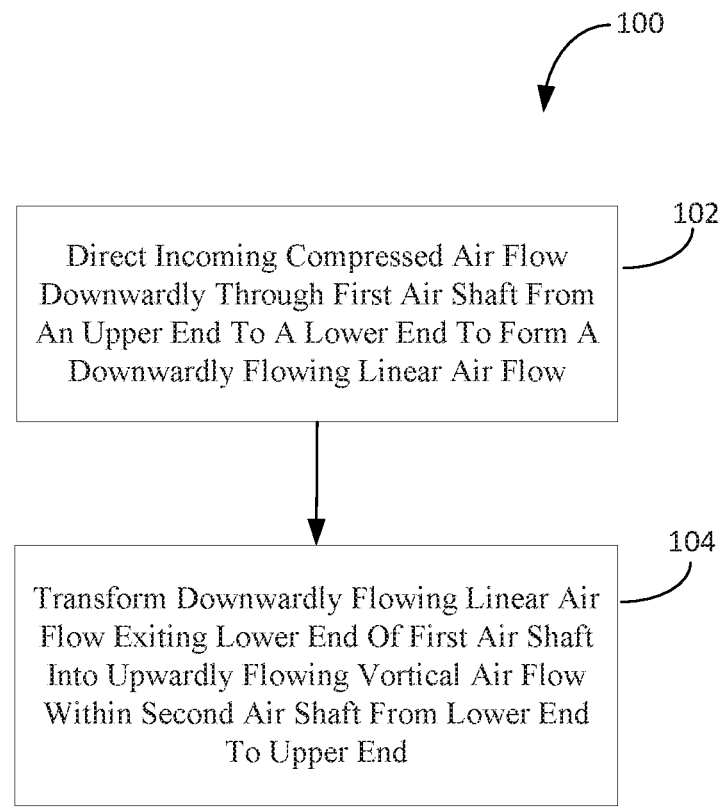
FIG. 6 is a flow diagram generally illustrating a method of separating fluids from a compresses air flow, according to one example.

FIG. 6 is a flow diagram generally illustrating one example of a method 100 of separating fluid from a compressed air flow, in accordance with the present disclosure. At 102, method 100 includes directing an incoming compressed air flow downwardly through a first air shaft from an upper end to a lower end to form a downwardly flowing linear air flow, such as incoming air flow 80 being directed down inner air shaft 40 to form downwardly flowing linear air flow 82 in FIG. 1. At 104, method 100 includes transforming the downwardly flowing linear air flow exiting the lower end of the first air shaft into an upwardly flowing vortical air flow within a second air shaft, the upwardly flowing vortival air flow flowing from a lower end to an upper end of the second air shaft, such as downwardly flowing linear air flow 82 being transitioned into upwardly flowing vortical air flow 84 by vortex baffle 60 in FIG. 1, where vortical air flow 84 flows from the floor 42b to the upper end 42a of the second air shaft 42.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof

What is claimed is:

1. A fluid separator for a compressed air system comprising: a head cap defining an inlet port and an outlet port; a first body defining an inner air shaft extending from an upper end to an opposing lower end, the upper end in fluid communication with the inlet port, the inner air shaft to form a downward linear air flow to the lower end from an incoming air flow received via the inlet port; a vortex baffle disposed about the lower end of the inner air shaft; and a second body forming an outer air shaft about the inner air shaft and the vortex baffle, the outer air shaft extending from a lower end proximate to the vortex baffle to an upper end in fluid communication with the outlet port, the vortex baffle including: a base flange forming a bottom of the inner air shaft and defining a floor of the outer air shaft; and a plurality of airfoil fins disposed about a circumference of the inner air shaft, the airfoil fins and the base flange, including a portion forming the floor of the outer air shaft, to receive and convert the downwardly flowing linear airflow from the lower end of the inner air shaft to an upwardly flowing vortical air flow in the outer air shaft to the outlet port.

2. The fluid separator of claim 1, the first and second bodies comprising tubular bodies, the first tubular body concentrically disposed within the second tubular body.

3. The fluid separator of claim 1, the plurality of airfoil fins disposed about and spaced from an external circumference of the inner air shaft.

4. The fluid separator of claim 3, a longitudinal dimension of the airfoil fins extending in an axial direction of the inner air shaft.

5. The fluid separator of claim 3, the first tubular body including a plurality of exit air slots at the lower end of the inner air shaft, the vortex baffle receiving the downwardly flowing linear air flow from the inner air shaft via the exit air slots.

6. The fluid separator of claim 5, the vortex baffle including a plurality of alignment tabs configured to engage the lower end of the inner air shaft and align the plurality of air foils with the exit air slots.

7. A fluid separator for a compressed air system comprising: a head cap defining an inlet port and an outlet port; a first body defining an inner air shaft extending from an upper end to an opposing lower end, the upper end in fluid communication with the inlet port; a vortex baffle including a base flange disposed about the lower end of the inner air shaft; and a second body forming an outer air shaft about the inner air shaft and the vortex baffle, the outer air shaft extending from a lower end proximate to the vortex baffle to an upper end in fluid communication with the outlet port; the vortex baffle coupled to the head cap by a threaded rod, the base flange including an integral threaded nut to receive the threaded rod.

8. The fluid separator of claim 7, the base flange including finger tabs extending therefrom to facilitate tightening of the vortex baffle to the threaded rod.

9. The fluid separator of claim 7, the first body disposed between the head cap and the vortex baffle, the vortex baffle to hold the first body in place when coupled to the threaded rod.

10. A compressed air water separator comprising:
outer air shaft having an upper end in fluid communication with an outlet port and a lower which is closed to form a sump basin;
an inner shaft disposed within the outer shaft and having an upper end in fluid communication with an inlet port and a lower end spaced from the sump basin, and having a plurality of exit air slots through sidewalls about a perimeter of the inner air shaft at the lower end; and
a vortex baffle disposed about a portion of the lower end of the inner shaft, the vortex baffle spaced from the inlet port and outlet port by at least a length of the inner shaft, the vortex baffle including:
base flange disposed below the lower end of the inner air shaft and forming a floor to the outer air shaft above the sump basin; and
a plurality of airfoil fins extending from the base flange and disposed about the perimeter of the inner air shaft proximate to the exit air slots.

11. The compressed air water separator of claim 10, a longitudinal dimension of the exit air slots and a longitudinal dimension of the airfoil fins extending in the direction of longitudinal axes of the inner and outer air shafts.

12. The compressed air water separator of claim 11, the vortex baffle including alignment features to engage alignment feature on the lower end of the inner air shaft to ensure a desired alignment of the airfoil fins with the exit air slots.

13. The compressed air water separator of claim 10, including a mesh filter disposed within the outer air shaft about the inner air shaft between the vortex baffle and the outlet port.

14. A method of separating fluid from a compressed air flow comprising:
concentrically positioning an first air shaft within a second air shaft;
directing an incoming compressed air flow downwardly through the first air shaft from an upper end to a lower end to form a downwardly flowing linear air flow;
closing off a bottom of the first air shaft and forming a plurality of slots in sidewalls of the first air shaft at the lower end;
closing off a portion of the second air shaft below the lower end of the first shaft with a flange;
positioning a plurality of airfoil fins within the second air shaft about an exterior perimeter of the lower end of the first air shaft above the flange adjacent to the plurality of slots; and
transforming the downwardly flowing linear air flow exiting the lower end of the first air shaft via the slots into an upwardly flowing vortical air flow within the second air shaft from an lower end to an upper end via the airfoil fins and the flange.

15. The method of claim 14, the airfoil fins extending longitudinally in a direction of a longitudinal axes of the first and second air shafts.

16. The method of claim 14, positioning a mesh filter in the second air shaft between the lower end of the first air shaft and the upper end of the second air shaft.

17. The method of claim 14, including:
forming a sump basin in a lower portion of the second air shaft below the lower end of the first air shaft in which fluids removed by centrifugal force from the vortical air flow collect by gravity.

* * * * *